US008350866B2

(12) United States Patent
Lin et al.

(10) Patent No.: US 8,350,866 B2
(45) Date of Patent: Jan. 8, 2013

(54) PROGRAMMING METHOD FOR DISPLAY DRIVER AND DISPLAY DRIVER AND DISPLAY USING THE SAME

(75) Inventors: Yang Ting Lin, Hsinchu (TW); Chin-Kuan Liao, Hsinchu (TW)

(73) Assignee: Orise Technology Co., Ltd., Hsinchu (TW)

( * ) Notice: Subject to any disclaimer, the term of this patent is extended or adjusted under 35 U.S.C. 154(b) by 1102 days.

(21) Appl. No.: 12/243,270

(22) Filed: Oct. 1, 2008

(65) Prior Publication Data

US 2009/0295764 A1 Dec. 3, 2009

(30) Foreign Application Priority Data

May 30, 2008 (TW) ............................... 97119999 A

(51) Int. Cl.
*G06F 13/00* (2006.01)

(52) U.S. Cl. ........................................ 345/537; 345/536

(58) Field of Classification Search .................. 345/204, 345/501, 530, 536, 537
See application file for complete search history.

(56) References Cited

U.S. PATENT DOCUMENTS

2006/0007237 A1 * 1/2006 Jeffrey ......................... 345/541

* cited by examiner

*Primary Examiner* — Jacinta M Crawford
(74) *Attorney, Agent, or Firm* — Muncy, Geissler, Olds & Lowe, PLLC

(57) ABSTRACT

The invention relates to a programming method for a display driver, and the display driver and a display using the same. The programming method includes: providing programming data; providing a display buffer, which is used for pre-storing display data in a display period, in the display driver; providing a non-volatile memory, which is coupled to the display buffer through a data bus; and proceeding a programming procedure, which includes the steps of: inputting the programming data to the display buffer; and programming the programming data from the display buffer to the non-volatile memory through the data bus.

16 Claims, 5 Drawing Sheets

PROGRAMMING METHOD FOR DISPLAY DRIVER AND DISPLAY DRIVER AND DISPLAY USING THE SAME

This application claims priority of No. 097119999 filed in Taiwan R.O.C. on Aug. 30, 2008) under 35 USC 119, the entire content of which is hereby incorporated by reference.

BACKGROUND OF THE INVENTION

1. Field of Invention

The invention relates to the technology associated with a display, and more particularly to a programming method for a display driver and the display driver using the same.

2. Related Art

With the progress of the technology, the electronic technology has been progressed from the earliest vacuum tube and transistor to the integrated circuit chip, which has the quite wide applications. Thus, the electronic products have gradually become the indispensable essentials in the life of the modern human beings. Meanwhile, the development relationship between the electronic technology and the display becomes more and more inseparatable. At present, the flat panel display has become the indispensable essential in the daily life. For example, the flat panel display can be applied to the large-scale liquid crystal display, such as a liquid crystal television or a liquid crystal computer display, and the middle-scale or small-scale liquid crystal display, such as a mobile telephone, a personal digital assistant or even a digital music mobile player.

The liquid crystal display usually has at least one built-in display driving circuit. In the driving circuit of the middle-scale or small-scale liquid crystal display, a programmable memory cell is usually built in the integrated circuit of the driving circuit in order to satisfy various panel properties or to provide more variability of the internal parameters. The programmable memory cell is typically implemented by a non-volatile memory, such as a flash memory, an erasable programmable read-only memory (EPROM) or a one-time programmable memory (OTP). In the environment where the driving circuit of the middle-scale or small-scale liquid crystal display is getting more and more diversified, the need of the usage of the programmable memory cell is getting higher and higher.

FIG. 1 is a block diagram showing a firmware program of a thin film transistor liquid crystal display (TFTLCD) driving circuit according to the prior art. Referring to FIG. 1, the circuit includes an N-bit register 101, a firmware program control unit 102, an N-bit decoder 103, a non-volatile memory 104 and a read register 105. The N-bit register 101 includes multiple M-bit sub-registers R101, and the N-bit decoder 103 is coupled to the non-volatile memory 104 through an M-bit bus.

During the programming process, when the N bits of data are to be programmed into the non-volatile memory 104, the to-be-programmed data is first programmed into the N-bit register 101. Thereafter, the firmware program control unit 102 controls the N-bit decoder 103 to select the to-be-programmed data from the N-bit register 101 and sequentially programs the to-be-programmed data into the N-bit non-volatile memory 104. When the driving circuit is operating, the firmware is read from the non-volatile memory 104 through the read register 105.

However, this architecture needs to provide the N-bit register 101 having the capacity the same as the non-volatile memory 104 in the display driving circuit to store the data to be programmed into the non-volatile memory 104. Therefore, when the data to be programmed into the non-volatile memory 104 gets more, this means that the number of bits of the non-volatile memory 104 gets greater, the register 101 to be provided is greater. In addition, the registers 101 only can be used in programming the firmware and cannot be shared with other functions. Thus, many layout areas of the integrated circuit are wasted. In addition, in order to program the firmware, the N-bit decoder 103 (N bits V.S. M bits) has to be provided according to the number of bits of the data bus of the non-volatile memory 104 so that the to-be-programmed data can be correctly selected. The N-bit decoder 103 occupies the respectable layout area in the integrated circuit.

SUMMARY OF THE INVENTION

It is therefore an object of the invention to provide a programming method for a display driver, and the display driver and a flat panel display using the method so that a larger layout area of the integrated circuit can be saved. When the number of the used programmable memory cells gets more, the advantage of this method becomes more apparent, and the saved area becomes larger.

To achieve the above-identified or other objects, the invention provides a programming method for a display driver. The programming method includes the steps of: providing programming data; providing a display buffer in the display driver, wherein the display buffer is used for pre-accessing display data in a display period; providing a non-volatile memory, which is coupled to the display buffer through a data bus; proceeding a programming procedure, which comprises the steps of: inputting the programming data to the display buffer; and programming the programming data from the display buffer to the non-volatile memory through the data bus.

The invention also provides a flat panel display including a display panel and the display driver of the invention. The display driver includes an input interface, a non-volatile memory, a display buffer, a control logic circuit and a driving circuit. The display buffer, coupled to the input interface and coupled to the non-volatile memory through a data bus, is used for pre-accessing display data in a display period. The control logic circuit is coupled to the input interface, the non-volatile memory and the display buffer. The driving circuit, coupled to the non-volatile memory, the control logic circuit, the display buffer and the display panel, is used for controlling a display timing of the display data according to the programming data to drive the display panel. When the display buffer is not used, the control logic circuit inputs the programming data to the display buffer through the input interface, and programs the programming data from the display buffer to the non-volatile memory through the data bus.

In the flat panel display and the display driver according to the preferred embodiment of the invention, the driving circuit includes an output driving circuit, a timing controller and a function register. The output driving circuit coupled to the display buffer is used for sequentially receiving the display data and thus driving a display panel. The timing controller, coupled to the control circuit and the output driving circuit, is used for controlling the output driving circuit to receive the display timing of the display data. The function register, coupled to the control circuit and the timing controller, is used for loading the programming data to the timing controller. In one embodiment, the non-volatile memory may be implemented by a flash memory, an erasable programmable read-only memory (EPROM) and a one-time programmable memory. In one embodiment, the display panel may be implemented by a liquid crystal display panel, an organic light emitter diode display panel and a carbon nanotube field emission display.

In the programming method for the display driver according to the preferred embodiment of the invention, the step of inputting the programming data to the display buffer includes: disposing a prescribed block in the display buffer, wherein an address allocation and a capacity of the prescribed block are the same as those of the non-volatile memory; and storing the programming data to the display buffer according to a position where the programming data should be allocated in the non-volatile memory.

The spirit of the invention is to replace the register for programming the programmable memory cell with the originally built-in display buffer in the display driving circuit. According to such the method, the area can be advantageously reduced without influencing the above-mentioned function of the display driving circuit.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
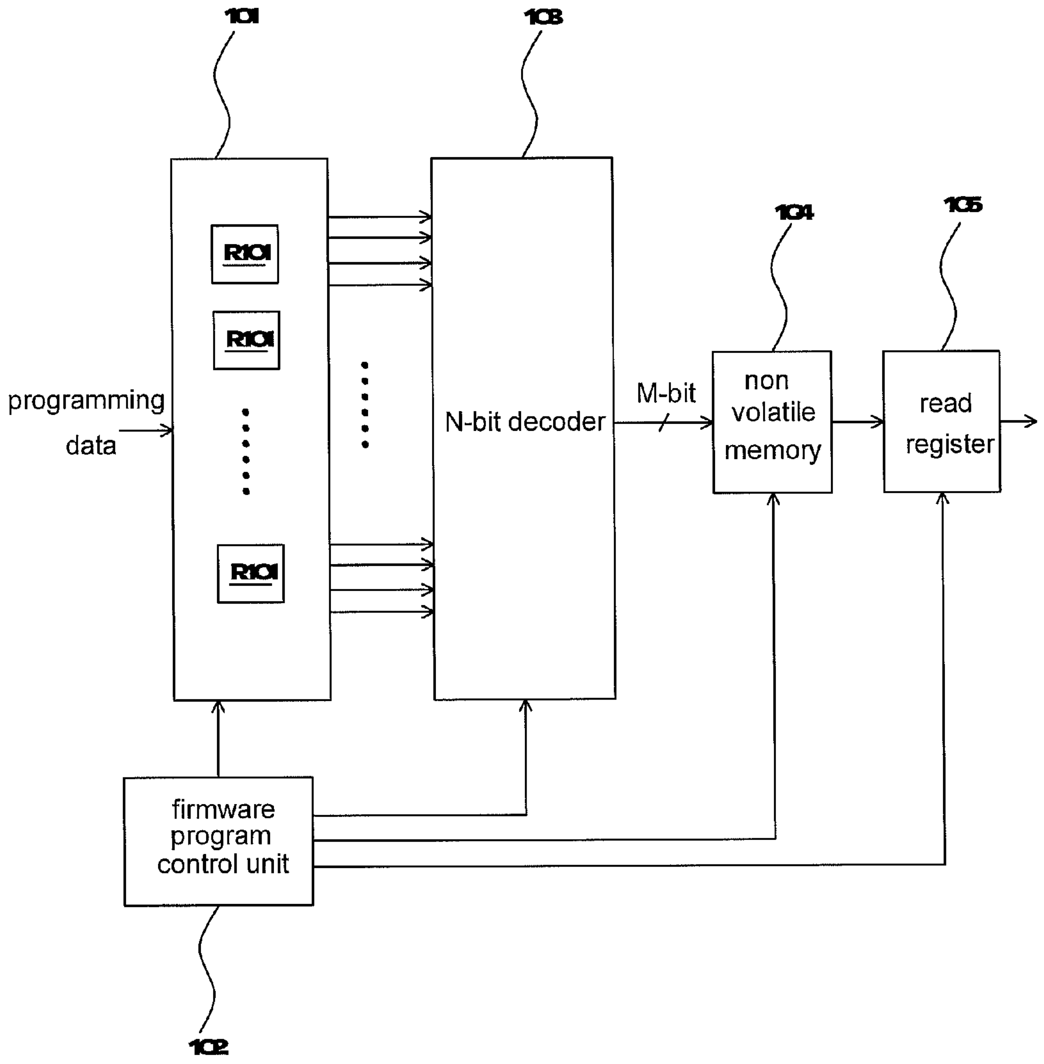
FIG. 1 (Prior Art)
FIG. 1 is a block diagram showing a firmware program of a thin film transistor liquid crystal display (TFTLCD) driving circuit according to the prior art.
Figure 2:
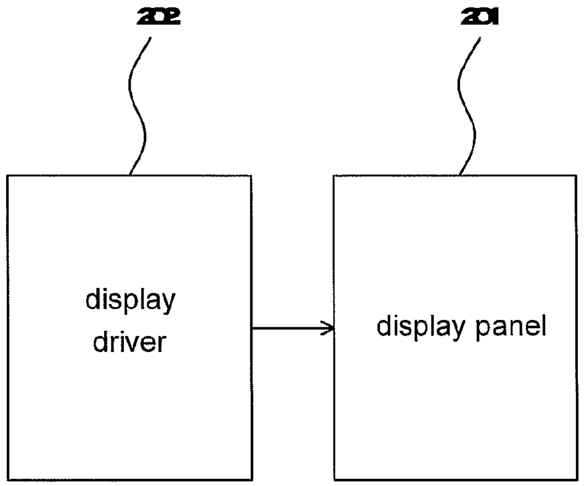
FIG. 2 is a circuit block diagram showing a flat panel display according to an embodiment of the invention.
Figure 3:
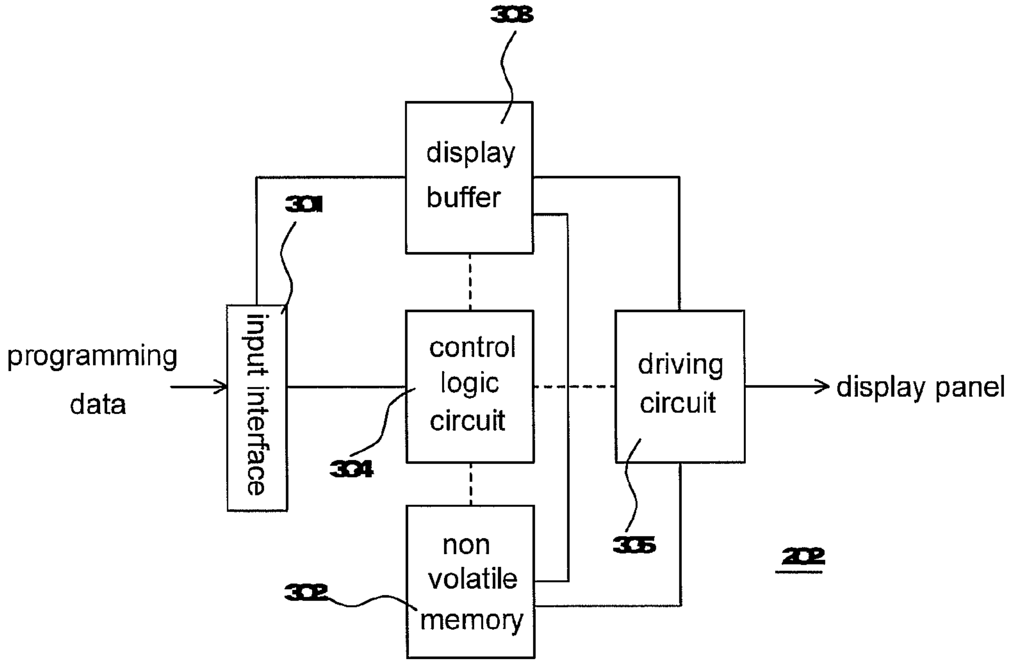
FIG. 3 is a circuit block diagram showing a display driver according to the embodiment of the invention.

FIG. 2 is a circuit block diagram showing a flat panel display according to an embodiment of the invention. Referring to FIG. 2, the flat panel display includes a display panel 201 and a display driver 202 for driving the display panel. FIG. 3 is a circuit block diagram showing the display driver 202 according to the embodiment of the invention. Referring to FIG. 3, the display driver 202 includes an input interface 301, a non-volatile memory 302, a display buffer 303, a control logic circuit 304 and a driving circuit 305. The connection relationship of this circuit is shown in the drawing.

For the sake of the description of the invention, it is first assumed that the display panel 201 is a liquid crystal display panel and that the display driver 202 is a timing controller. During the normal operation, an image is inputted from the input interface to the display buffer 303, and the driving circuit 305 reads the firmware from the non-volatile memory 302 and controls the data display timing of the display buffer 303 according to the firmware, and thus controls the liquid crystal display panel 201.

When the flat panel display is being developed, the firmware in the display driver 202 often has to be updated in order to enhance the product stability, and it is necessary to program the non-volatile memory 302. When the firmware is being updated, the display buffer 303 in the display driver 202 is not accessing. Thus, to-be-programmed data is first stored into the display buffer 303 through the input interface 301 according to the pre-programmed addresses when the programming command is issued in this embodiment. Thereafter, the control logic circuit 304 controls the to-be-programmed data stored in the display buffer 303, and the to-be-programmed data is sequentially programmed to the non-volatile memory 302 according to the addresses thereof.

According to the above-mentioned embodiment, one of ordinary skill in the art may easily understand that the programming method does not need the additional register 101 of the prior art to pre-store the to-be-programmed data, but the to-be-programmed data is temporarily stored in the display buffer 303. Thus, the additional register 101 is not needed. With the development of the technology, the user's desired functions are getting more and more so that the number of bits of the non-volatile memory 302 in the display driver 202 is getting higher and higher. When the number of bits of the non-volatile memory 302 gets higher, the layout area of the integrated circuit, which is saved according to the invention, gets larger. In addition, because the shared memory is the display buffer 303 having the main function of pre-storing the image data, the number of bits of the display buffer 303 is generally far greater than the number of bits of the non-volatile memory 302.

In the above-mentioned embodiment, the original register 101 is replaced with the display buffer 303, which pre-stores the to-be-programmed data. If the allocation of programming the data into the address of the display buffer 303 is not well made, a large layout area still has to be used to construct the N-bit decoder 103 even if the register 101 can be saved. However, if the allocation of the address is properly made, the layout area of the selector can be saved. How to properly allocate the programming data into the address of the display buffer 303 will be described in the following with reference to one embodiment.

Figure 4:
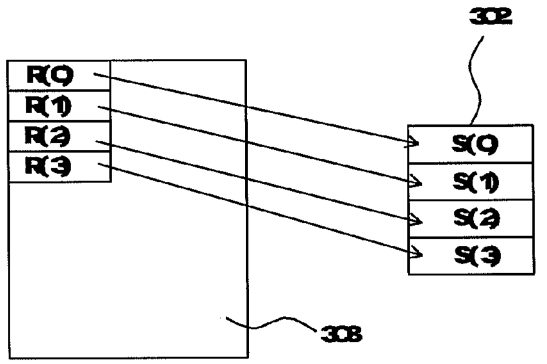
FIG. 4 shows the internal memory allocation of a non-volatile memory 302 and a display buffer 303 according to the embodiment of the invention.

FIG. 4 shows the internal memory allocation of the non-volatile memory 302 and the display buffer 303 according to the embodiment of the invention. As shown in FIG. 4, the non-volatile memory 302 of this embodiment is divided into four storage blocks S(0) to S(3), and four row addresses R(0) to R(3) are allocated in the display buffer 303 and thus correspond to the storage blocks S(0) to S(3) to be programmed into the non-volatile memory 302 in advance. In order to describe the further effects brought by this embodiment simply, it is assumed that the display buffer 303 is a static random access memory having an input/output data bus with the width of 8 bits. In addition, it is further assumed that the input bus of the non-volatile memory 302 of this embodiment has the width of 8 bits, and the output bus of the non-volatile memory 302 has the width of 64 bits. In addition, the non-volatile memory 302 of this embodiment has the four storage blocks S(0) to S(3). Because the output bus thereof has the width of 64 bits, each of the storage blocks S(0) to S(3) has the storage of 64×8 bits.

According to the above-mentioned embodiment, it is obtained that the static random access memory 303 is similarly divided into four blocks, that is, four rows R(0) to R(3) (Row0 to Row3). Before the data is programmed into the non-volatile memory 302, the data is first programmed into the four rows R(0) to R(3) (Row0 to Row3) of the static random access memory 303. That is, 512 (=8×64) bits are respectively programmed into the four rows R(0) to R(3) of the static random access memory 303. After the data is completely programmed into the four rows R(0) to R(3), which are pre-allocated in the static random access memory 303, the control logic circuit 304 starts to program the non-volatile memory 302. At this time, the control logic circuit 304 sends the same address to the static random access memory 303 and the non-volatile memory 302 simultaneously. For example, the following Table 1 is an address allocation table of the non-volatile memory 302, and the following Table 2 is an address allocation table of the static random access memory 303.

TABLE 1

| | Data 0 000 | Data 1 001 | Data 2 010 | Data 3 011 | Data 4 100 | Data 5 101 | Data 6 110 | Data 7 111 |
|---|---|---|---|---|---|---|---|---|
| 000000 | α | β | γ | . . . | . . . | . . . | . . . | . . . |
| 000001 | . . . | . . . | . . . | . . . | . . . | . . . | . . . | . . . |
| 000010 | . . . | . . . | . . . | . . . | . . . | . . . | . . . | . . . |
| 000011 | . . . | . . . | . . . | . . . | . . . | . . . | δ | . . . |
| 000100 | . . . | . . . | . . . | . . . | . . . | . . . | . . . | . . . |
| 000101 | . . . | . . . | . . . | . . . | . . . | . . . | . . . | . . . |
| 000110 | . . . | . . . | . . . | . . . | . . . | . . . | . . . | . . . |
| 000111 | . . . | . . . | . . . | . . . | . . . | . . . | . . . | ϵ |

TABLE 2

| | Column address 0000000 | Column address 0000001 | Column address 0000010 | . . . . . . | Column address 0011110 | . . . | Column address 0111111 |
|---|---|---|---|---|---|---|---|
| Row address 00 | α | β | γ | . . . . . . | δ | . . . | ϵ |

Table 1 only shows the address allocation of the first portion S(0) of the non-volatile memory 302, and Table 2 only shows the address allocation of the row address R(0) of the static random access memory 303. The capacity of the non-volatile memory 302 is equal to 2048 bits, and the bandwidth capacities of the input bus and the output bus are respectively equal to 8 bits and 64 bits. The non-volatile memory 302 is divided into four storage blocks, the addresses of the first storage block S(0) range from 000000 to 000111, the addresses of the second storage block S(1) range from 001000 to 001111, the addresses of the third storage block S(2) range from 010000 to 010111, and the addresses of the fourth storage block S(3) range from 011000 to 011111. The addresses of the static random access memory 303 are thus shown in Table 2 in order to match with the storing method of the non-volatile memory 302. The static random access memory 303 is programmed into the four rows R(0) to R(3) for respectively storing four portions of data to be programmed into the non-volatile memory 302. Each row provides 64×8 bits for storing the data. That is, the row address 0 of the static random access memory 303 has 64 pieces of 8-bit data, so the column addresses of the static random access memory 303 only ranging from 000000(0) to 111111 (63) are used to store the data, and the other addresses are not used.

After the to-be-programmed data is stored to the static random access memory 303 according to the programmed address, the proceeding of the programming procedure is started. At this time, the control logic circuit 304 sequentially outputs the addresses of the data, which are to be programmed from the static random access memory 303 to the non-volatile memory 302, to the static random access memory 303 and the non-volatile memory 302. For example, the control logic circuit 304 outputs the address 000000001 to the static random access memory 303 and the non-volatile memory 302. The to-be-programmed data is read from the row address 0 (00) and the column address 1 (0000001) of the static random access memory 303, and programmed into the row address 000000 and the column address 001 of the non-volatile memory 302 (i.e., the first piece of data β (data 1) of the row). Similarly, if the addresses of the to-be-programmed data in the static random access memory 303 are the row address 0 (00) and the column address 52 (0011110), the piece of data will be programmed into the row address 000011 and the column address 110 of the non-volatile memory 302 (i.e., the sixth piece of data δ (data 6) of the row).

Due to the address allocation, no decoder has to be disposed between the non-volatile memory 302 and the static random access memory 303, and the programming operation can be proceeded by only coupling its data bus.

Figure 5:
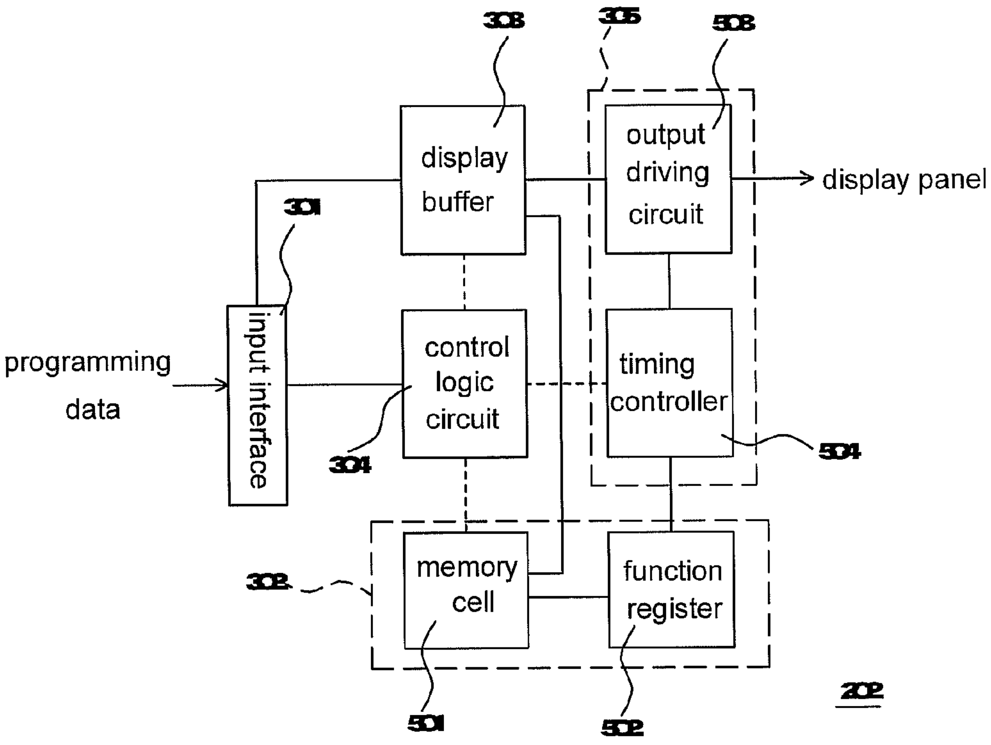
FIG. 5 is a circuit block diagram showing a display driver 202 according to the embodiment of the invention.

FIG. 5 is a circuit block diagram showing the display driver 202 according to the embodiment of the invention. Referring to FIG. 5, in addition to a memory cell 501, the non-volatile memory 302 of this embodiment further includes a function register 502 for loading the programming data of the memory cell 501 to the control circuit and the timing controller. In addition, the driving circuit 305 includes an output driving circuit 503 and a timing controller 504. The output driving circuit 503 sequentially receives the display data pre-stored in the display buffer 303 and thus drives the display panel. The timing controller 504 controls the output driving circuit 503 to receive the data displaying timing. The operation principles thereof are the same as those of FIGS. 2 to 4, so detailed descriptions thereof will be omitted.

Although only the liquid crystal display panel is illustrated in the above-mentioned embodiment, one of ordinary skill in the art should understand that the liquid crystal display panel, the organic light emitter diode display panel and the carbon nanotube field emission display may be applied to the embodiment of the invention. So, the invention is not particularly limited thereto. In addition, although the example of the non-volatile memory is not described in the above-mentioned embodiment, one of ordinary skill in the art may easily understand that the flash memory, the EPROM and the one-time programmable memory may serve as the non-volatile memory of the embodiment of the invention. In addition, any non-volatile memory composed of two of the flash memory, the EPROM and the one-time programmable memory, or any non-volatile memory composed of the flash memory, the EPROM and the one-time programmable memory may be used to implement the invention. So, the invention is not particularly limited thereto.

Figure 6:
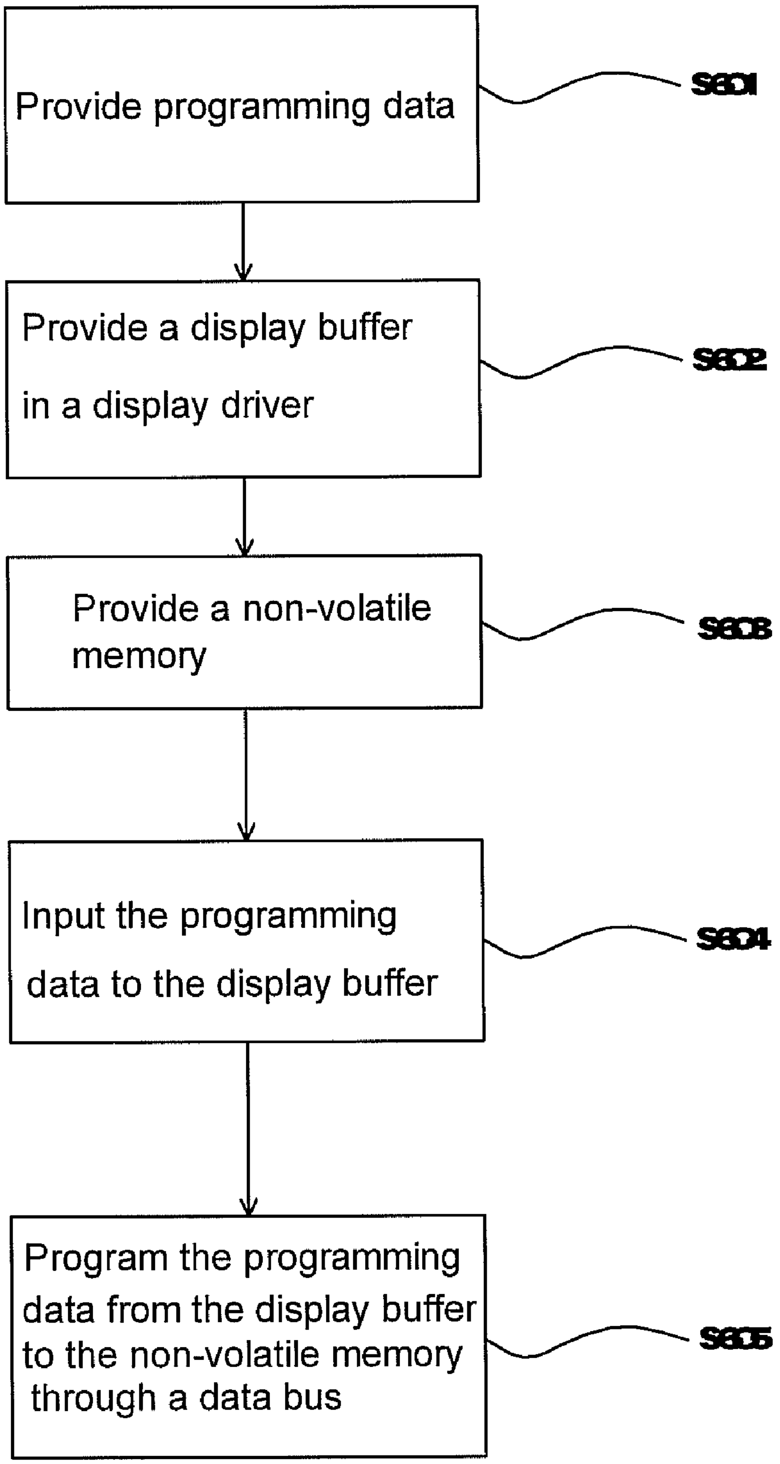
FIG. 6 is a flow chart showing a programming method for the display driver according to the embodiment of the invention.

According to the above-mentioned embodiments, the programming method for a display driver according to the invention may be concluded as follows. FIG. 6 is a flow chart showing a programming method for the display driver according to the embodiment of the invention. Referring to FIG. 6, the method includes the following steps.

In step S601, programming data is provided.

In step S602, a display buffer is provided in the display driver, wherein the display buffer pre-accesses display data in a display period.

In step S603, a non-volatile memory is provided, wherein the non-volatile memory is coupled to the display buffer through a data bus.

In step S604, the programming data is inputted to the display buffer.

In step S605, the programming data is programmed from the display buffer to the non-volatile memory through the data bus.

Figure 7:
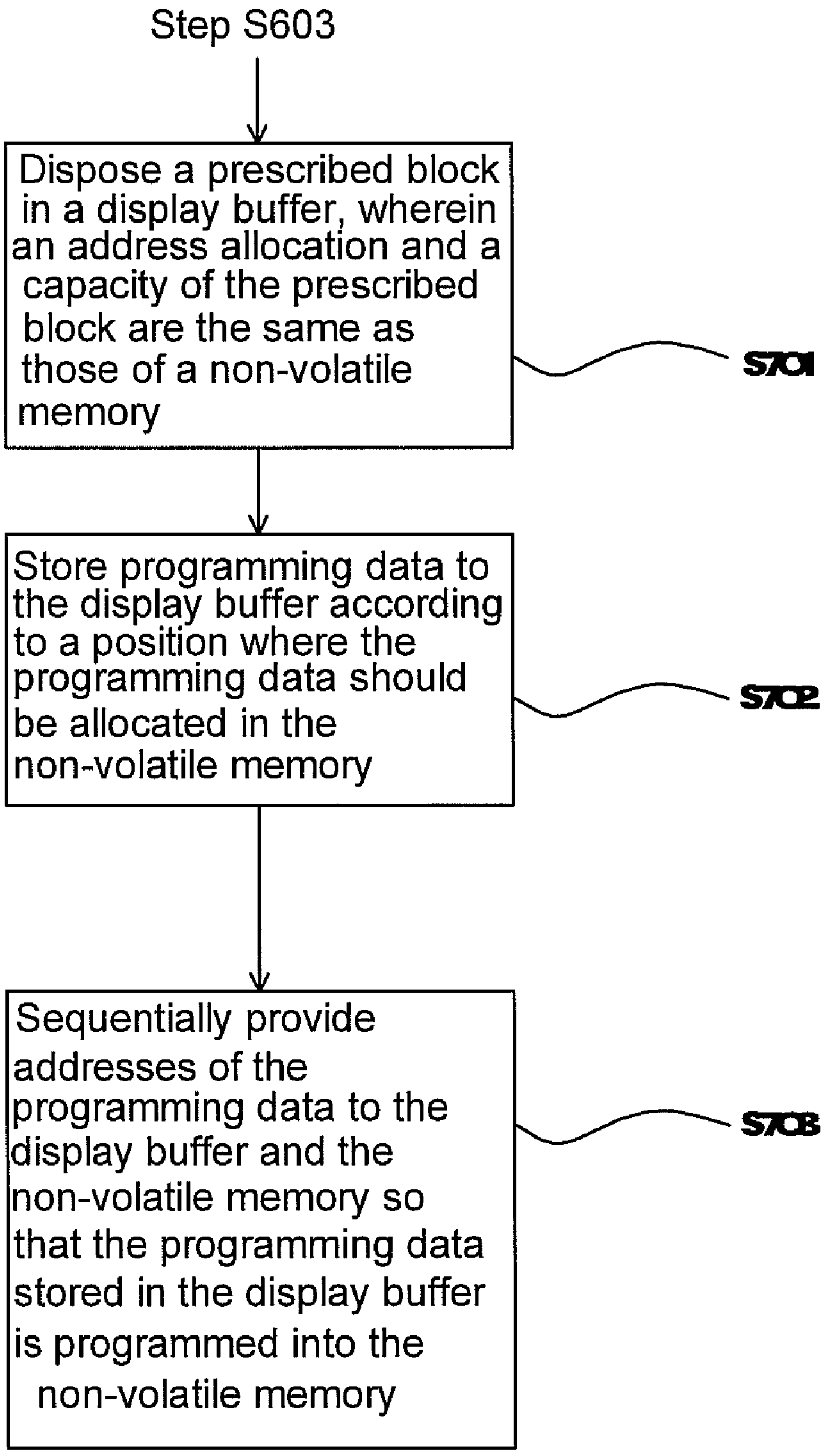
FIG. 7 is a detailed flow chart showing steps S604 and S605 in the programming method for the display driver according to the embodiment of the invention.

In another detailed embodiment, the step S604 may include the steps of FIG. 7. Referring to FIG. 7, the step S604 includes the following steps.

In step S701, a prescribed block is disposed in the display buffer, wherein the address allocation and the capacity of the prescribed block are the same as those of the non-volatile memory. As shown in FIG. 4, the non-volatile memory 302 and the display buffer 303 have the same internal allocation and the same capacity.

In step S702, the programming data is stored to the display buffer according to a position where the programming data should be allocated in the non-volatile memory.

In this case, the step S605 may be replaced with the step S703.

In step S703, the addresses of the programming data are sequentially provided to the display buffer and the non-volatile memory so that the programming data stored in the display buffer is programmed into the non-volatile memory.

In summary, the spirit of the invention is to replace the register for programming the programmable memory cell with the originally built-in display buffer in the display driving circuit. According to such the method, the area can be advantageously reduced without influencing the above-mentioned function of the display driving circuit.

In addition, an address programming method is further proposed in the embodiment of the invention to further reduce the usage of the layout area of the integrated circuit. Thus, the invention can achieve the better effect, and the manufacturing cost may be further lowered.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A programming method for a display driver, the method comprising:

providing programming data;

providing a display buffer in the display driver, wherein the display buffer is used for pre-accessing display data in a display period;

providing a non-volatile memory, which is coupled to the display buffer through a data bus;

proceeding a programming procedure, which comprises the steps of:

inputting the programming data to the display buffer; and programming the programming data from the display buffer to the non-volatile memory through the data bus, wherein the step of inputting the programming data to the display buffer comprises:

disposing a prescribed block in the display buffer, wherein an address allocation and a capacity of the prescribed block are the same as those of the non-volatile memory; and storing the programming data to the display buffer according to a position where the programming data should be allocated in the non-volatile memory.

2. The method according to claim 1, wherein the step of inputting the programming data to the display buffer comprises:

sequentially providing addresses of the programming data to the display buffer and the non-volatile memory so that the programming data stored in the display buffer is programmed into the non-volatile memory.

3. The method according to claim 1, wherein the non-volatile memory is selected from the group consisting of a flash memory, an erasable programmable read-only memory (EPROM) and a one-time programmable memory.

4. A display driver, comprising:

an input interface;

a non-volatile memory;

a display buffer, coupled to the input interface and coupled to the non-volatile memory through a data bus, for pre-accessing display data in a display period;

a control logic circuit, coupled to the input interface, the non-volatile memory and the display buffer, wherein when the display buffer is not used for pre-accessing display data in the display period, the control logic circuit inputs programming data to the display buffer through the input interface, and programs the programming data from the display buffer to the non-volatile memory through the data bus; and a driving circuit, coupled to the non-volatile memory, the control logic circuit and the display buffer, for controlling a display timing of the display data according to the programming data.

5. The display driver according to claim 4, wherein the driving circuit comprises:

an output driving circuit, coupled to the display buffer, for sequentially receiving the display data to drive a display panel; and a timing controller, coupled to the control logic circuit and the output driving circuit, for controlling the output driving circuit to receive the display timing of the display data.

6. The display driver according to claim 5, wherein the non-volatile memory comprises:

a function register, coupled to the control logic circuit, for loading the programming data to the timing controller.

7. The display driver according to claim 4, wherein:

a prescribed block is disposed in the display buffer, and an address allocation and a capacity of the prescribed block are the same as those of the non-volatile memory, and;

the control logic circuit stores the programming data to the display buffer according to a position where the programming data should be allocated in the non-volatile memory.

8. The display driver according to claim 7, wherein when the programming data is being programmed, the control logic circuit further proceeds the step:

sequentially providing addresses of the programming data to the display buffer and the non-volatile memory so that the programming data stored in the display buffer is programmed into the non-volatile memory.

9. The display driver according to claim 4, wherein the non-volatile memory is selected from the group consisting of a flash memory, an erasable programmable read-only memory (EPROM) and a one-time programmable memory.

10. A flat panel display, comprising:

a display panel; and a display driver, which comprises:

an input interface;

a non-volatile memory;

a display buffer, coupled to the input interface and coupled to the non-volatile memory through a data bus, for pre-accessing display data in a display period;

a control logic circuit, coupled to the input interface, the non-volatile memory and the display buffer, wherein when the display buffer is not used for pre-accessing display data in the display period, the control logic circuit inputs programming data to the display buffer through the input interface, and programs the programming data from the display buffer to the non-volatile memory through the data bus; and a driving circuit, coupled to the non-volatile memory, the control logic circuit, the display buffer and the display panel, for controlling a display timing of the display data according to the programming data to drive the display panel.

11. The flat panel display according to claim 10, wherein the driving circuit comprises:

an output driving circuit, coupled to the display buffer, for sequentially receiving the display data to drive the display panel; and a timing controller, coupled to the control logic circuit and the output driving circuit, for controlling the output driving circuit to receive the display timing of the display data.

12. The flat panel display according to claim 10, wherein the non-volatile memory comprises:

a function register, coupled to the control logic circuit, for loading the programming data to the timing controller.

13. The flat panel display according to claim 10, wherein:

a prescribed block is disposed in the display buffer, and an address allocation and a capacity of the prescribed block are the same as those of the non-volatile memory; and the control logic circuit stores the programming data to the display buffer according to a position where the programming data should be allocated in the non-volatile memory.

14. The flat panel display according to claim 13, wherein when the programming data is being programmed, the control logic circuit further proceeds the step:

sequentially providing addresses of the programming data to the display buffer and the non-volatile memory so that the programming data stored in the display buffer is programmed into the non-volatile memory.

15. The flat panel display according to claim 10, wherein the non-volatile memory is selected from the group consisting of a flash memory, an erasable programmable read-only memory (EPROM) and a one-time programmable memory.

16. The flat panel display according to claim 10, wherein the display panel is selected form the group consisting of a liquid crystal display panel, an organic light emitter diode display panel and a carbon nanotube field emission display.

* * * * *